United States Patent
Lucas et al.

(10) Patent No.: US 11,514,043 B2
(45) Date of Patent: Nov. 29, 2022

(54) DOMAIN SPECIFIC LANGUAGE FOR IMPROVED GRAPH STITCHING

(71) Applicants: Atlassian Pty Ltd, Sydney (AU); Atlassian, Inc., San Francisco, CA (US)

(72) Inventors: Diogo Lucas, Sydney (AU); Andreas Marek, Sydney (AU)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 583 days.

(21) Appl. No.: 16/416,601

(22) Filed: May 20, 2019

(65) Prior Publication Data

US 2020/0311085 A1 Oct. 1, 2020

Related U.S. Application Data

(60) Provisional application No. 62/825,434, filed on Mar. 28, 2019.

(51) Int. Cl.
*G06F 16/2453* (2019.01)
*G06F 16/2455* (2019.01)
(Continued)

(52) U.S. Cl.
CPC ........ *G06F 16/24542* (2019.01); *G06F 9/547* (2013.01); *G06F 16/212* (2019.01); *G06F 16/2455* (2019.01)

(58) Field of Classification Search
CPC .............. G06F 16/24542; G06F 9/547; G06F 16/2455; G06F 16/212; G06F 16/9024;
(Continued)

(56) References Cited

U.S. PATENT DOCUMENTS 9,753,744 B1* 9/2017 Wells ................. G06F 16/2423
11,256,693 B2* 2/2022 Wittern ............. G06F 16/24565
(Continued)

OTHER PUBLICATIONS

Wieruch, R., The Road to GraphQL Your journey to master pragmatic GraphQL in JavaScript with React.js and Node.js, Leanpub, pp. 1-357, Nov. 12, 2018. (Year: 2018).*
(Continued)

*Primary Examiner* — Cheyne D Ly
(74) *Attorney, Agent, or Firm* — Brownstein Hyatt Farber Schreck, LLP

(57) ABSTRACT

In an embodiment, a method comprises creating and storing, at a client computer, schema blueprint data comprising a plurality of different service definitions, each of the service definitions composed in a domain specific language (DSL), each service definition comprising identification of an endpoint and one or more schema definition language elements; generating, based on the schema blueprint data, a combined schema in a graph query language processing system, the combined schema indicating which querying operations and mutating operations that a graph endpoint of the graph query language processing system can execute, the generating the combined schema comprising: automatically mapping a first resource of a first plurality of digitally stored resources from the endpoint of a first service definition of the plurality of service definitions to a first field in the combined schema; automatically mapping a second resource of a second plurality of digitally stored resources from the endpoint of a second service definition of the plurality of service definitions to a second field in the combined schema; generating and submitting a query to the graph endpoint based on the combined schema that causes, by traversing the mappings, retrieving the first resource from the endpoint of the first service definition and the second resource from the endpoint of the second service definition.

20 Claims, 4 Drawing Sheets

(51) Int. Cl.
*G06F 9/54* (2006.01)
*G06F 16/21* (2019.01)

(58) Field of Classification Search
CPC .. G06F 16/211; G06F 16/242; G06F 16/2433; G06F 16/245; G06F 16/182; G06F 8/34
See application file for complete search history.

(56) References Cited

U.S. PATENT DOCUMENTS

2018/0081645 A1\* 3/2018 Alurralde Iturri ........ G06F 8/38
2019/0065500 A1\* 2/2019 Martin .............. G06F 16/24552
2019/0340287 A1\* 11/2019 Tamjidi .................. G06F 9/547

OTHER PUBLICATIONS

Brito et al., Migrating to GraphQL: A Practical Assessment, SANER 2019, Hangzhou, China Research Papers, pp. 140-150, Feb. 1, 2019. (Year: 2019).\*

AWS AppSync, "AWS AppSync Developer Guide", Dated 2019, 300 pages.

\* cited by examiner

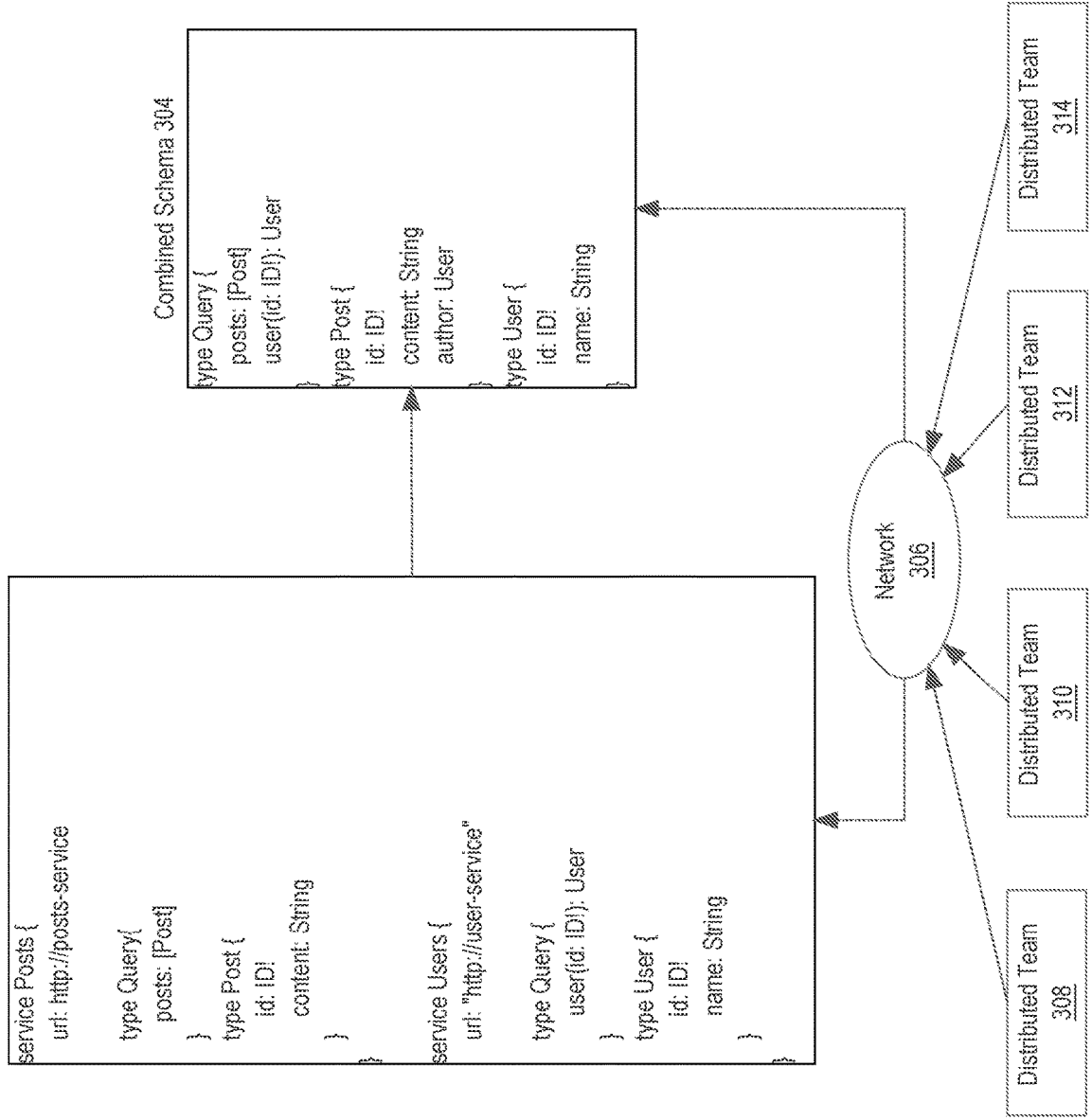

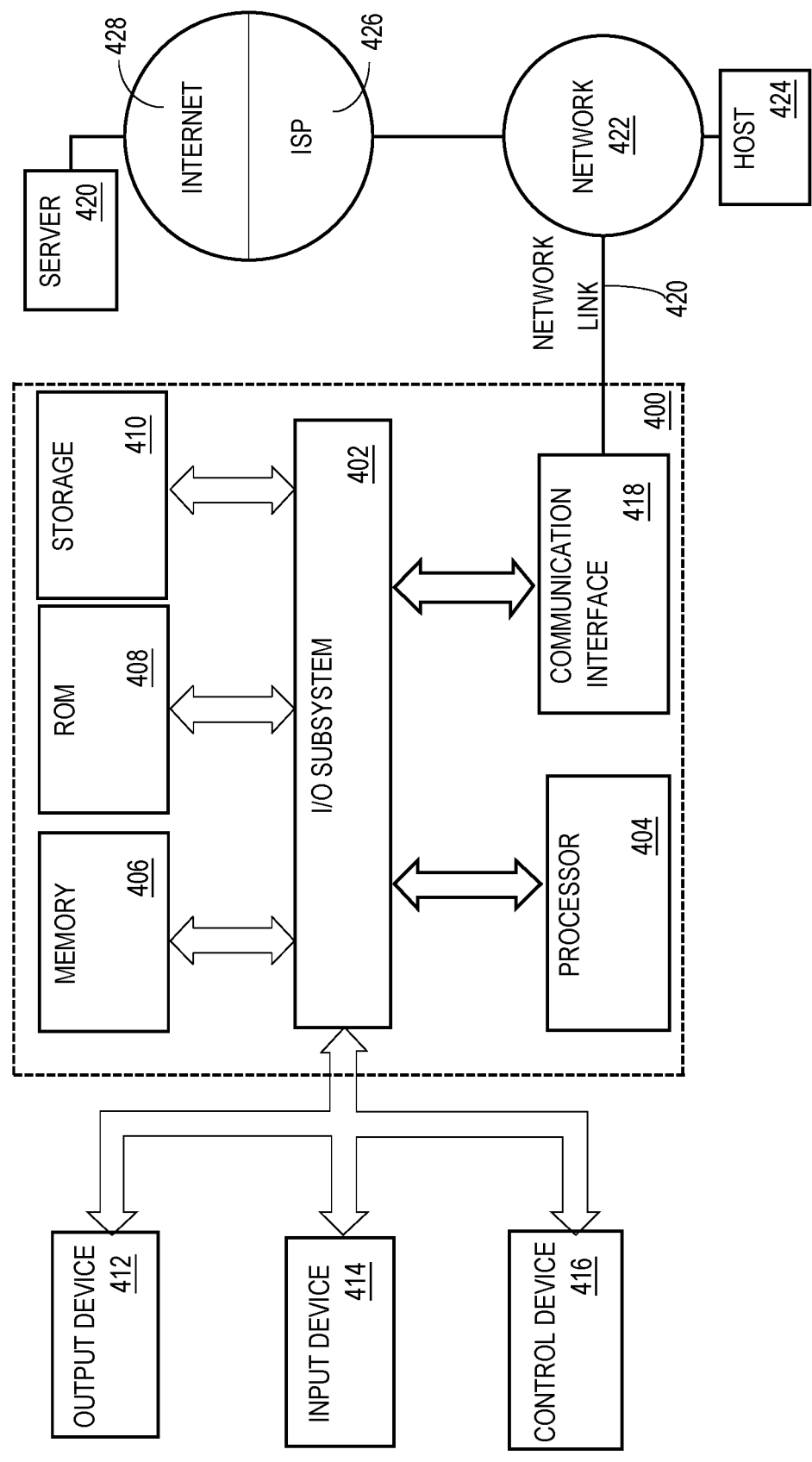

DOMAIN SPECIFIC LANGUAGE FOR IMPROVED GRAPH STITCHING

BENEFIT CLAIM

This application claims the benefit under 35 U.S.C. § 119(e) of provisional application 62/825,434, filed Mar. 28, 2019, the entire contents of which are hereby incorporated by reference for all purposes as if fully set forth herein.

TECHNICAL FIELD

One technical field of the present disclosure is query language processing. Another technical field is computer-implemented application programming interface (API) management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

GraphQL is a data query language developed internally by Facebook and publicly released in 2015. It provides an alternative to representational state transfer (REST) and ad-hoc web service architectures. It allows client processes to define the structure of the data required, and exactly the same structure of the data is returned from the server. It is a strongly typed runtime which allows clients to dictate what data is needed, therefore preventing excessively large amounts of data from being returned. Significant GraphQL clients include Apollo Client and Relay. GraphQL servers are available for multiple languages, including JavaScript, Python, Ruby, Java, C#, Scala, Go, Elixir, Erlang, PHP, and Clojure. GraphQL also includes a Schema Definition Language (SDL).

While GraphQL has many benefits, its use is largely underdeveloped. Considering the current state of the industry, there is a need for improved systems, methods of using GraphQL to enhance external APIs and SDKs, through defining and generating schemas or APIs.

BRIEF DESCRIPTION OF THE DRAWINGS

In the drawings:

FIG. 3 shows a block diagram that illustrates interactions between distributed teams, schema blueprint data, and a combined schema.

FIG. 4 shows a block diagram of a computer system with which an embodiment of the invention may be implemented.

DESCRIPTION OF EXAMPLE EMBODIMENTS

Figure 1:
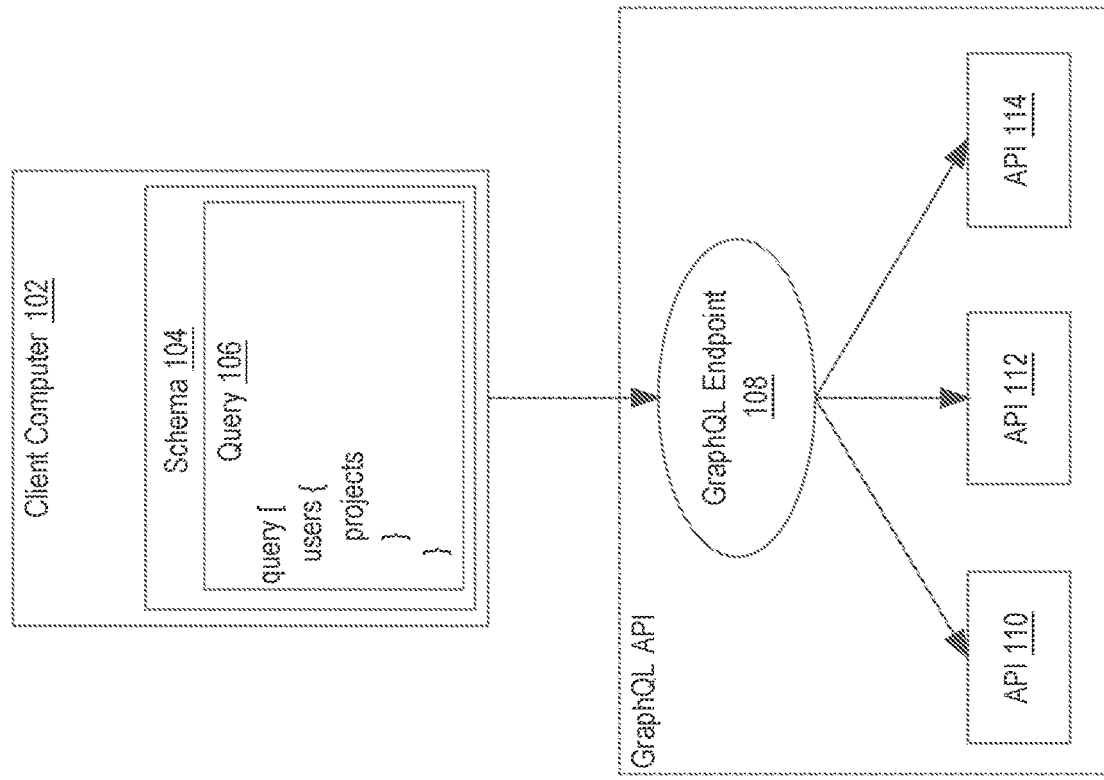
FIG. 1 illustrates a GraphQL query architecture.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections according to the following outline:
 1. Overview
 2. Example Graph Query Language
 3. Schema Blueprint Data
 4. Combined Schemas
 5. Field Transformations
 6. Authorization Scopes
 7. Example Procedure
 8. Benefits
 9. Hardware Overview
 10. Extensions and Alternatives
 1. Overview The following describes systems and methods for addressing needs such as described above, among other needs, by automatically generating combined schemas using a domain specific language.

In an embodiment, a method comprises creating and storing, at a client computer, schema blueprint data comprising a plurality of different service definitions, each of the service definitions composed in a domain specific language (DSL), each service definition comprising identification of an endpoint and one or more schema definition language elements; generating, based on the schema blueprint data, a combined schema in a graph query language processing system, the combined schema indicating which querying operations and mutating operations that a graph endpoint of the graph query language processing system can execute, the generating the combined schema comprising: automatically mapping a first resource of a first plurality of digitally stored resources from the endpoint of a first service definition of the plurality of service definitions to a first field in the combined schema; automatically mapping a second resource of a second plurality of digitally stored resources from the endpoint of a second service definition of the plurality of service definitions to a second field in the combined schema; generating and submitting a query to the graph endpoint based on the combined schema that causes, by traversing the mappings, retrieving the first resource from the endpoint of the first service definition and the second resource from the endpoint of the second service definition.

In one embodiment, each service definition of the plurality of different service definitions includes identification of an underlying schema and generating the combined schema includes validating each service definition of the plurality of different service definitions based on each respective underlying schema.

In one embodiment, generating the combined schema in the graph query language processing system comprises: generating a first resolver function to resolve the first field in the combined schema with the first resource and generating a second resolver function to resolve the second field in the combined schema with the second resource.

In one embodiment, the one or more schema definition language elements of each service definition include a query type comprising one or more fields and the combined schema aggregates each of the one or more fields of the query type of the one or more schema definition language elements of each service definition into one or more fields of the combined schema.

In one embodiment, the one or more schema definition language elements of the first service definition include a first type comprising one or more fields and the one or more schema definition language elements of the second service definition include a second type comprising one or more fields. The schema blueprint data includes a mapping of the one or more fields of the first type of the first service definition to be resolved by the one or more fields of the second type of the second service definition.

In one embodiment, the one or more schema definition language elements of the first service definition include a first type comprising one or more fields, the one or more fields including a scope identifier. Generating and submitting the query to the graph endpoint causes the graph endpoint to perform a scope check based on the scope identifier and one or more scopes included in the query.

Other aspects, features and embodiments will become apparent from the disclosure as a whole.

2. Example Graph Query Language

A graph query language processing system is a specification that defines how to fetch data from a backend system. To illustrate clear examples, this disclosure will refer to GraphQL for use in some embodiments, but other embodiments may use other graph query language systems that are functionally similar or equivalent to GraphQL, and GraphQL is not required in every embodiment. GraphQL, as an example, is similar to REST and often uses the same HTTP(s) transports as REST. However, rather than using various path-based URIs and HTTP verbs, GraphQL uses a single endpoint with a defined schema that specifies how to not only fetch data but also mutate, or change, data.

Building a GraphQL service requires a schema to be defined by various schema definition elements that describe the types, fields, and queries available for the service. A schema is the contract between the server and the client that specifies not only what data is available but also what types of data is available and how individual pieces of data are related.

The core building block within a schema is the type. Types provide a wide-range of functionality within a schema, including the ability to: create relationships between types (e.g. between a Book and an Author) and define which data-fetching (querying) and data-manipulation (mutating) operations can be executed by the client.

Every field within a GraphQL schema has either a primitive type, such as int, string, float, boolean, etc., or a complex type. Schemas are composed of classes made up of one or more fields. Clients may select those classes, choosing precisely the relevant fields needed.

```
interface Person {
    firstName: String!
    lastName: String
}
type Actor implements Person {
    firstName: String!
    lastName: String
```

```
}
type Movie {
    name: String!
    genre: Genre!
    actors: [Character]
    director: [Director]
}
type Query {
    movies: [Movie]
}
```

For example, the above code snippet shows a GraphQL movie-based schema with defined types. Object types describe object types that can be fetched, including what fields it provides. For example, Movie is an object type, with fields name, genre, actors, and director. [Character] indicates an array of Character objects. Query types describe an entry point into a GraphQL service. The Query type defines the queries available for the GraphQL service.

Each type is composed of one or more fields, which can be scalar values or complex objects that refer to other types. All GraphQL queries must at least specify fields to be returned.

GraphQL implements a human-readable schema syntax known as its Schema Definition Language ("SDL") to define schemas. The SDL is used to express the types available within a schema and how those types relate to each other. The declarations, as shown in the above code snippet, express the relationships and the shape of the data to return, not where the data comes from or how it might be stored—which is covered outside the SDL. By drawing the logical connections in the schema definition using SDL, a client is able to see what data is available and request it in a single optimized query.

SDL includes a query type. A GraphQL query is for fetching data and compares to the GET verb in REST-based APIs. In order to define what queries are possible on a server, the Query type is used within the SDL as shown in the above code snippet. The Query type is one of many root-level types which defines functionality for clients and acts as an entry-point to other more specific types within the schema. An example GraphQL query for the above defined schema is shown below:

```
query {
    movies {
        name
        actors {
            firstName
            lastName
        }
    }
}
```

SDL also includes a mutation type. Mutations are operations sent to the server to create, update or delete data. These are comparable to the PUT, POST, PATCH and DELETE verbs on REST-based APIs. Much like how the Query type defines the entry-points for data-fetching operations on a GraphQL server, the root-level mutation type specifies the entry points for data-manipulation operations.

Schemas also support arguments within field selections to further define customization to clients. As an example, a particular numerical metric field may choose to provide a unit argument that specifies what data unit to output the value in. This is in contrast to typical systems that output a value in a single standard unit and rely on documentation to express what unit it is—putting the unnecessary onus on each client to manage the conversions. With GraphQL, the client can specify the precise unit as an argument to the data selection. GraphQL can then manage the conversions and return the appropriate value to the client. Ultimately, this customization allows the logic and control to happen server side, which is often more effective and easier, removing the stress from each client application.

As discussed above, query types describe an entry point into a GraphQL service. GraphQL enables developers to translate their backend data into the application data graph on the frontend using schemas and SDL. This schema defines the types and queries available and then becomes the specification for an API. Once the schema is defined, resolver functions are used for fetching data from remote endpoints.

When a client issues a query to a GraphQL endpoint, each field on each type is resolved by a resolver function at the GraphQL endpoint. The resolver function defines how data is fetched for that field and returns data for that field. Resolvers may query databases, other APIs, or data services. This allows resolvers to make use of database clients, network libraries, or any sort of custom data fetching logic.

As discussed above, GraphQL uses a single endpoint, referred to herein as an 'endpoint' or 'graph endpoint', with a defined schema that specifies how to not only fetch data but also mutate, or change, data.

FIG. 1 illustrates a GraphQL query architecture. Using GraphQL, a user on the client computer 102 first defines a schema 104 using SDL. The client computer 102 then may submit a query 106, based on the schema 104, to a GraphQL endpoint 108. The GraphQL endpoint 108 may exist on a server computer and be accessible over a network. The query 106 is received at the GraphQL endpoint 108 and is executed by the server computer. Executing the query 106 may comprise GraphQL services executing resolver functions for each field. Executing resolver functions may include querying a database, one or more external APIs 110, 112, 114 and/or services, or other REST endpoints. GraphQL services may then format the data as specified by the query 106 and schema 104 and deliver the result to the client computer 102. The result is returned that mirrors the shape of the requested query, typically as JSON or XML.

REST APIs are generally a collection of endpoints, with each endpoint representing a specific resource. When a client wants to access more than one resource at a time, it requires them to make multiple round-trips to the server to retrieve the data they need. For example, in order to access multiple APIs, a client computer is required to make multiple API requests—at least one for each API that the client wants to access. This is in contrast to the GraphQL example described above where only a single query submitted to a single GraphQL endpoint is needed to access multiple APIs.

Additionally, clients usually have no control over the fields that are returned by a REST endpoint. The REST API returns all fields that are specified for an endpoint, no matter which content the client has requested. The main advantage of GraphQL over REST services is the ability to send the requested data over just one endpoint. Not only can multiple resources be combined into one output, clients also have control over the fields that are returned.

For example, for an endpoint defined as '/movie/:movieId' where the 'movieId' specifies the ID of a movie, the following payload is returned for the movie ID associated with the movie 'Fight Club':

```
{
    "budget": 63000000,
    "genres": [...],
    "homepage": "",
    "id": 580,
    "original_language": "en",
    "original_title": "Fight Club",
    "overview": "...",
    "popularity": 0.5,
    "poster_path": null,
    "production_companies": [ ... ],
    "production_countries": [ ... ],
    "status": "Released",
    "tagline": "...",
    "title": "Fight Club",
    "vote_average": 7.9,
    "vote_count": 3489
}
```

In addition to the basic details about a movie as shown above, to retrieve details about the movie cast, a request to the endpoint '/movies/:movieId/credits' must be made. Thus, a client would have to make a request to at least two endpoints to retrieve desired movie data—one request to a first endpoint to retrieve the basic details of the movie and a second request to a second endpoint to retrieve the movie credits. Additionally, using REST, the entire payload from each endpoint is received when a request is made to each respective endpoint. In order to display only the desired data to a user or operate on specific fields, the fields from the endpoint payloads must be filtered.

Using GraphQL techniques described herein, the overfetching of information is simplified by defining a query containing all the fields or the information that are desired from the endpoint. For example, to retrieve the title, vote_average, vote_count, and cast (name, character) for the movie 'Fight Club' this would translate to the following in GraphQL:

```
// GraphQL query for 'Fight Club', movieId = 580
movie(movieId: 580) {
    title,
    vote_average,
    vote_count,
    credits {
        cast {
            name,
            character
        }
    },
}
```

GraphQL techniques described herein provide more flexible access to the underlying data through composition, selection, and mutation. Using techniques described herein, a client may define what data exactly is needed at query time, all the data required to render an application view can be requested in a single request, reducing the number of roundtrip network requests and with that, the application latency.

As shown above, rather than having to fetch multiple documents via REST, only to use a handful of data from each of those requests, a client may specify precisely which fields to select from an API payload. Using techniques described herein, a client is able to make a single call to fetch the required information rather than to construct several REST requests to fetch the same data. This allows for clients to reduce network cost and latency by avoiding multiple trips.

As discussed herein, an 'endpoint' is a URI or URL that is used to make a request. A 'resource' is focused on the data set that is returned by a request. A data set can be accessed from an endpoint. A data set returned by a request may comprise one or more resources. A resource may comprise one or more objects. For example, in XML, a resource may correspond to an element or sub-element of the element such as <student> </student>. In JSON, a resource may correspond to a name/value pair. Different resources may be electronically digitally stored in different distributed data storage devices to which access is obtained as part of executing the processes described herein.

3. Schema Blueprint Data

A domain specific language (DSL) may be used to extend SDL to provide enhancements to a graph-based API. A DSL may enable a user to create schema blueprint data. Schema blueprint data includes a plurality of service definitions, which together describe a combined schema or API.

In general, a service definition describes an underlying schema and field mappings. A service definition comprises an identification of an endpoint and one or more schema definition language elements. Schema blueprint data including service definitions may be created or defined by a user and stored in a file or collection of files.

Specifically, a service definition may include an endpoint such as a URL or URI that points to the endpoint of the service. The remainder of the service definition may include schema definition elements such as object type definitions, interfaces, etc. In some embodiments, a service definition includes a reference or link to an underlying schema that is used to verify the service definition at runtime.

For example, the below code snippet shows schema blueprint data that includes two different service definitions composed in a DSL:

```
service Posts {
    url: http://posts-service
    schema: "./Posts.graphql"
    type Query {
        posts: [Post]
    }
    type Post {
        id: ID!
        content: String
        authorID: ID => author: User // This transforms the
authorId from a Post into a full User field
    }
service Users {
    url: "http://user-service"
    schema: "./Users.graphql"
    type Query {
        user(id: ID!): User
    }
}
    type User {
        id: ID!
        name: String
    }
}
```

The schema blueprint data from the above code snippet defines two services: "Posts" and "User". "Posts" provides a data construct for blog posts and "User" provides a data construct for users. Each service in the above snippet includes a URL, a link to an underlying schema, and one or more schema definition elements. For example, the "Posts" service includes the URL: "http://posts-service", underlying schema link "./Posts.graphql", and the schema definition elements "type Query" and "type Post". The "Users" service includes the URL: http://user-service, underlying schema link "./Users.graphql", and the schema definition elements "type Query" and "type User".

As discussed above, a service definition describes an underlying schema and may include a link to the underlying schema. The underlying schema may be used to verify or validate the service definition at runtime. For example, if a field is defined in a service definition which does not exist or has an incompatible type with the underlying schema, an error is detected, and the service definition is not validated.

Additionally, a service definition or respective underlying schema of the service definition may specify field mappings that map fields of the service definition or respective underlying schema to selected resources from the endpoint included in the service definition. For example, a specific resource from the "http://posts-service" endpoint from the above code snippet may be mapped to the "content" field in the "Post" object type.

4. Combined Schemas

Schema blueprint data may be used to generate a combined schema, also referred to herein as a "graph based API". As discussed above, schema blueprint data includes a plurality of service definitions, which together describe a combined schema. A combined schema comprises a schema that combines multiple schemas described by a plurality of service definitions included in schema blueprint data.

Generating a combined schema may comprise automatically mapping resources from an endpoint of each service definition to fields in the combined schema. Additionally, generating the combined schema may comprise aggregating one or more fields of a query type of each service definition into one or more fields of a query type the combined schema.

For example, a combined schema generated based on the schema blueprint data of the above code snippet that includes the "Post" and "User" service definitions is shown in the below code snippet:

```
type Query {
    posts: [Post]
    user(id: ID!): User
}
type Post {
    id: ID!
    content: String
    author: User // The author is internally resolved by the user service
}
type User {
    id: ID!
    name: String
}
```

As shown in the above code snippet, the two services "Post" and "User" are combined into a combined schema composed in SDL. Each of the one or more fields of the query type of each of the "Post" and "User" service definitions are aggregated into one or more fields of the "Query" type of the combined schema. Additionally, resources from the endpoints each of the "Post" and "User" service definitions are mapped to fields in the combined schema.

In some embodiments, during combined schema generation, resolver functions are generated that define how data is fetched for each field and returns data for that respective field. Resolver functions are used for fetching data, such as resources, from endpoints specified in a service definition and may be generated based on field mappings defined in service definitions or underlying schemas of respective service definitions.

5. Field Transformations

Two different service definitions may be combined through a field transformation. A field transformation maps a first field associated with a first service definition to be resolved against a second field associated with a second service definition.

For example, as shown in the below code snippet, the service "Posts" includes an "authorID" field that identifies an author of a post. When a request is made for the "authorID" from the "Posts" service, the field transformation mapping "ID=>author: User" is used to match the "authorID" to a user in the "Users" service and retrieve corresponding user information from the "Users" service.

```
service Posts {
    ...
    type Post {
        ...
        authorID: ID => author: User
    }
}
service Users {
    ...
    type User {
        id: ID!
        ...
    }
}
```

Without the field transformation mapping, the "Posts" service is only aware of the "authorID" of the post and is not aware of the details of a "User" that corresponds to the "authorID". Using traditional APIs, a first request would be required to retrieve the authorID from the "Posts" service and then a second request would be required to retrieve user information from the "Users" service using the authorID from the first request. However, using a field transformation mapping, only a single request is required to retrieve the requested information from multiple services.

6. Authorization Scopes

Scopes provide a way to authorize requests. When a client application sends a request to a graph endpoint, the graph endpoint may perform a scope check to determine whether the client application has permissions to perform an operation included in the request. A scope identifier is defined as a field in a service definition. A scope check is performed by comparing a scope identifier to one or more scope identifiers included in a request.

For example, in the below code snippet, the "Users" service definition includes a scope identifier "@scopes(["userprofile:read"])". The scope identifier requires that only client applications that have been granted the "userprofile:read" scope can request a User's name.

```
service Users {
    ...
    type User {
        id: ID!
        @scopes(["userprofile:read"])
        name: String
    }
}
```

When a graph endpoint receives a request from a client application for a User's name, the graph endpoint performs a scope check by comparing the "userprofile:read" scope specified in the "Users" service definition to one or more scope identifiers included in the request. If the one or more scope identifiers included in the request include the scope "userprofile:read", the request from the client application is authorized to request user profile data. Else, the request from the client application is not authorized and any request for user profile data is denied.

7. Example Procedure

Figure 2:
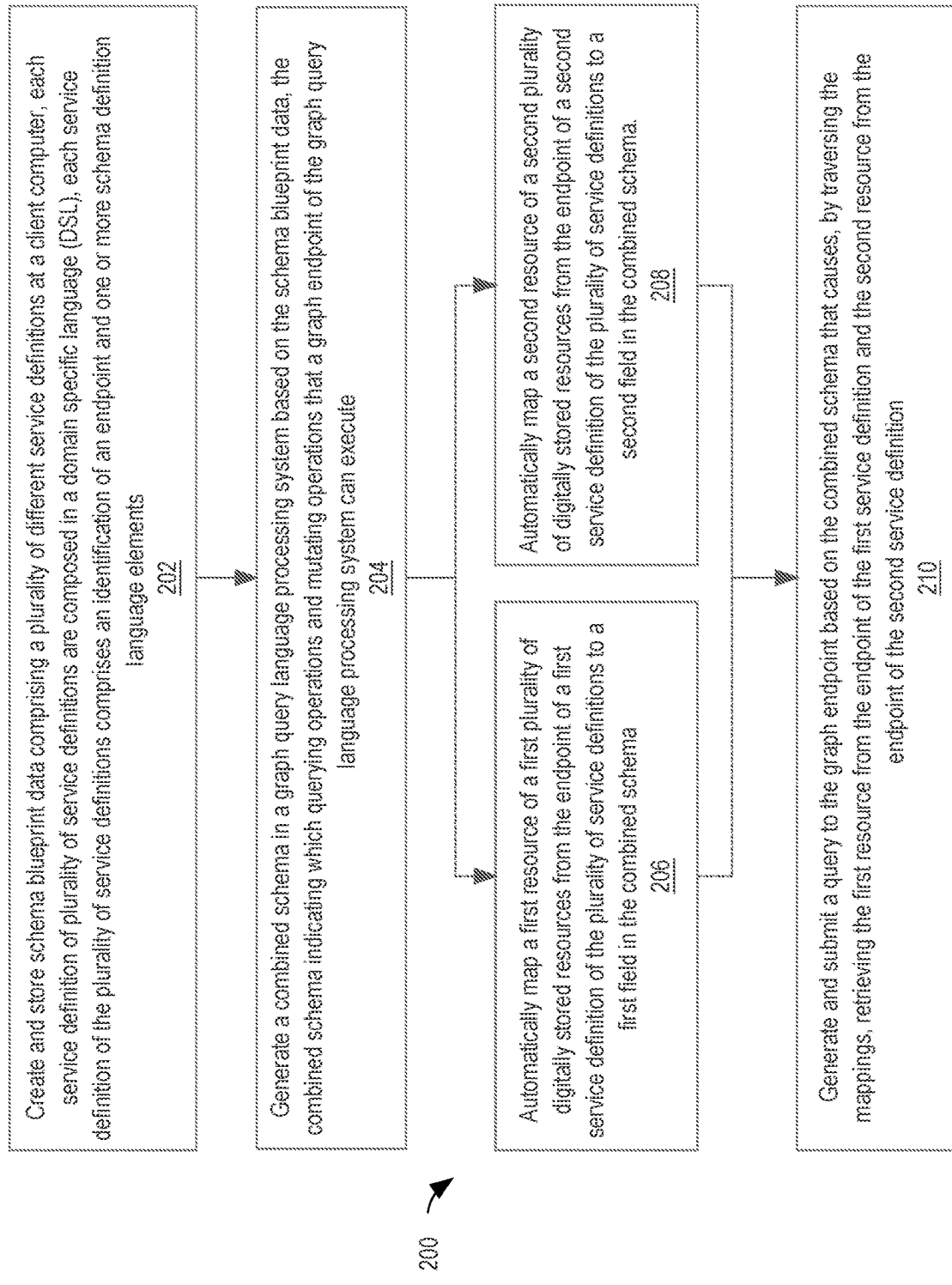
FIG. 2 illustrates an example flowchart of a method for automatically integrating multiple graph data structures using a domain specific language.

FIG. 2 shows an example flow 200 of a method for automatically integrating multiple graph data structures using a domain specific language.

Although the steps in FIG. 2 are shown in an order, the steps of FIG. 2 may be performed in any order and are not limited to the order shown in FIG. 2. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

At step 202, schema blueprint data comprising a plurality of different service definitions is created and stored at a client computer. Each service definition of plurality of service definitions are composed in a domain specific language (DSL). Each service definition of the plurality of service definitions comprises an identification of an endpoint and one or more schema definition language elements.

In an embodiment, the endpoint of the first service definition hosts a first server program that is responsive to representational state transfer (REST) calls to an application programming interface (API) implemented by the server program. The endpoint of the second service definition hosts a second server program that is responsive to REST calls to an API implemented by the second server program.

In an embodiment, the endpoint of the first service definition hosts a first server program that is responsive to querying operations and mutating operations to a graph endpoint implemented by the server program and wherein the endpoint of the second service definition hosts a second server program that is responsive to querying operations and mutating operations to a graph endpoint implemented by the second server program.

In an embodiment, the one or more schema definition language elements of the first service definition include a first type comprising one or more fields and the one or more schema definition language elements of the second service definition include a second type comprising one or more fields. The schema blueprint data includes a mapping of the one or more fields of the first type of the first service definition to be resolved by the one or more fields of the second type of the second service definition.

At step 204, a combined schema is generated in a graph query language processing system based on the schema blueprint data created and stored in step 202. The combined schema indicates which querying operations and mutating operations that a graph endpoint of the graph query language processing system can execute. Along with the combined schema, a first resolver function is generated to resolve the first field in the combined schema with the first resource and a second resolver function to resolve the second field in the combined schema with the second resource.

At step 206, as part of generating the schema of step 204, a first resource of a first plurality of digitally stored resources from the endpoint of a first service definition of the plurality of service definitions is automatically mapped to a first field in the combined schema.

At step 208, as part of generating the schema of step 204, a second resource of a second plurality of digitally stored resources from the endpoint of a second service definition of the plurality of service definitions is automatically mapped to a second field in the combined schema.

At step 210, a query is generated and submitted to the graph endpoint based on the combined schema that causes, by traversing the mappings, retrieving the first resource from the endpoint of the first service definition and the second resource from the endpoint of the second service definition. When a client issues a query to a graph endpoint, each field on each type is resolved by a resolver function at the graph endpoint. For example, in context of flow 200, the graph endpoint executes the first resolver function to resolve the first field in the combined schema with the first resource and also executes the second resolver function to resolve the second field in the combined schema with the second resource.

In an embodiment, a digital data display is generated and displayed at a client computer that shows both the first resource and the second resource. The combined schema defines the format of presenting the first resource and second resource on the client computer.

In an embodiment, one or more schema definition language elements of the first service definition include a first type comprising one or more fields, the one or more fields including a scope identifier. When a query is submitted to the graph endpoint, the query causes the graph endpoint to perform a scope check based on the scope identifier and one or more scopes included in the query.

8. Benefits

Techniques described herein provide an improved way of defining a graph-based API across distributed teams. A top-down approach of defining schema blueprint data comprised of service definitions in a DSL provides an intuitive way for different teams who collaborate on a graph-based API to create, modify, and enhance the API.

Using techniques described herein, distributed teams can define a graph-based API by creating schema blueprint data that describes a combined schema in a human readable syntax. Schema blueprint data comprises a plurality of service definitions composed in a DSL that control the structure of a combined schema or API once generated. Thus, if a team member desires to query a graph-based API, the team member can quickly view the combined schema and determine a query syntax for the desired data. Additionally, if a team member desires to add a new service to a graph-based API or modify an existing service of a graph-based API, service definitions can easily be created or modified in schema blueprint data, and a new combined schema can quickly be generated based on the schema blueprint data.

Previous attempts and implementations of automatically combining schemas suffer from either a brute force approach which requires developers to provide non-scalable, custom code to combine schemas from different teams or a bottom up approach which suffers from clashes between field elements and loss of control of the resulting combined schema structure. These approaches suffer from providing a lack of visibility of resulting combined schemas and often include complex supporting architectures that require one or more services to manage schemas.

By extending the SDL to a DSL that includes service definitions, a simple, scalable construct is provided for accessing or modifying data at an endpoint. Service definitions can easily be added by any team member to schema blueprint data and a graph-based API can be smoothly scaled throughout different teams and services. Using this framework, a service is not required to manage schemas and supporting architectures can be simplified. Additionally, by using a DSL as described herein, for an organization that includes distributed teams that use different programming languages for different parts of an API, the collaboration of distributed teams can be unified by providing a programming language-agnostic DSL that can combine APIs from many different programming languages.

FIG. 3 shows a block diagram that illustrates interactions between distributed teams, schema blueprint data, and a combined schema. For example, various distributed teams 308-314 of developers may be associated with different computing devices. A distributed team can access schema blueprint data 302 via network 306 and create or modify different service definitions composed in a DSL. The syntax of the DSL is designed at a high level such that service definitions can easily be created or modified by distributed teams 308-314. Additionally, schema blueprint data 302 controls the structure of a combined schema 304, which is generated based on schema blueprint data 302. The combined schema 304 provides a scalable graph-based API that expresses relationships and the shape of the data to return. Once a combined schema 304 is generated, distributed teams 308-314 can quickly infer what data is made available by the underlying services and how to access objects defined in the combined schema 304. If one of the distributed teams 308-314 desires to add a new service definition, the distributed team updates schema blueprint data 302 that includes the new service definition and a new combined schema is quickly generated.

9. Implementation Mechanisms—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 4 is a block diagram that illustrates an example computer system with which an embodiment may be implemented.

In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 204. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 208 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

10. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   creating and storing, at a client computing device, the client computing device communicatively coupled with a graph query language processing system over a network, schema blueprint data comprising a plurality of different service definitions, each of the service definitions composed in a domain specific language (DSL), each service definition comprising identification of an endpoint and one or more schema definition language elements, wherein the graph query language processing system comprises one or more graph endpoints residing in one or more server computers;
   generating, at the client computing device, based on the schema blueprint data, a combined schema of the graph query language processing system, the combined schema indicating which querying operations and mutating operations that the one or more graph endpoints of the graph query language processing system can execute, the generating the combined schema comprising:
      automatically mapping, at the client computing device, a first resource of a first plurality of digitally stored resources from an endpoint of a first service definition of the plurality of different service definitions to a first field in the combined schema; and
      automatically mapping, at the client computing device, a second resource of a second plurality of digitally stored resources from the endpoint of a second service definition of the plurality of different service definitions to a second field in the combined schema; and
   generating, at the client computing device, a query to a graph endpoint of the one or more graph endpoints based on the combined schema that causes, by traversing the mappings, retrieving the first resource from the endpoint of the first service definition and the second resource from the endpoint of the second service definition for submitting the generated query to the graph endpoint.

2. The method of claim 1, further comprising:
   generating and causing displaying, at the client computing device, a digital data display that shows both the first resource and the second resource.

3. The method of claim 1, wherein the DSL is an extension of a schema definition language (SDL).

4. The method of claim 1, wherein the endpoint of the first service definition hosts a first server program that is responsive to representational state transfer (REST) calls to an application programming interface (API) implemented by the server program, and
   wherein the endpoint of the second service definition hosts a second server program that is responsive to REST calls to an API implemented by the second server program.

5. The method of claim 1, wherein each service definition of the plurality of different service definitions includes identification of an underlying schema,
   wherein generating the combined schema further comprises:
      validating each service definition of the plurality of different service definitions based on each respective underlying schema.

6. The method of claim 1, wherein generating the combined schema further comprises:
   generating a first resolver function to resolve the first field in the combined schema with the first resource; and
   generating a second resolver function to resolve the second field in the combined schema with the second resource.

7. The method of claim 6, wherein retrieving the first resource from the endpoint of the first service definition and the second resource from the endpoint of the second service definition comprises:

causing executing the first resolver function to resolve the first field in the combined schema with the first resource; and causing executing the second resolver function to resolve the second field in the combined schema with the second resource.

8. The method of claim 1, wherein the one or more schema definition language elements of each service definition include a query type comprising one or more fields, and wherein the combined schema aggregates each of the one or more fields of the query type of the one or more schema definition language elements of each service definition into one or more fields of the combined schema.

9. The method of claim 1, wherein the one or more schema definition language elements of the first service definition include a first type comprising one or more fields, wherein the one or more schema definition language elements of the second service definition include a second type comprising one or more fields, and wherein the schema blueprint data includes a mapping of the one or more fields of the first type of the first service definition to be resolved by the one or more fields of the second type of the second service definition.

10. The method of claim 1, wherein the one or more schema definition language elements of the first service definition include a first type comprising one or more fields, the one or more fields including a scope identifier, and wherein the query to the graph endpoint causes the graph endpoint to perform a scope check based on the scope identifier and one or more scopes included in the query.

11. A computer system comprising one or more client computing devices communicatively coupled with a graph endpoint over a network, wherein the graph endpoint resides in a server computer, and wherein the one or more client computing devices comprise:

one or more processors; and one or more memories storing instructions which, when executed by the one or more processors, cause the one or more processors to perform operations comprising:

prior to generating a query to the graph endpoint:

creating and storing, at the one or more client computing devices, schema blueprint data comprising a plurality of different service definitions, each of the service definitions composed in a domain specific language (DSL), each service definition comprising identification of an endpoint and one or more schema definition language elements;

generating, at the one or more client computing devices, based on the schema blueprint data, a combined schema in a graph query language processing system, the combined schema indicating which querying operations and mutating operations that the graph endpoint of the graph query language processing system can execute, the generating the combined schema comprising:

automatically mapping, at the one or more client computing devices, a first resource of a first plurality of digitally stored resources from an endpoint of a first service definition of the plurality of different service definitions to a first field in the combined schema; and automatically mapping, at the one or more client computing devices, a second resource of a second plurality of digitally stored resources from the endpoint of a second service definition of the plurality of different service definitions to a second field in the combined schema;

generating, at the one or more client computing devices, a query to the graph endpoint based on the combined schema that causes, by traversing the mappings, retrieving the first resource from the endpoint of the first service definition and the second resource from the endpoint of the second service definition; and submitting, from the one or more client computing devices, the generated query to the graph endpoint.

12. The computer system of claim 11, wherein the operations further comprise:

generating and causing displaying, at the one or more client computing devices, a digital data display that shows both the first resource and the second resource.

13. The computer system of claim 11, wherein the DSL is an extension of a schema definition language (SDL).

14. The computer system of claim 11, wherein the endpoint of the first service definition hosts a first server program that is responsive to representational state transfer (REST) calls to an application programming interface (API) implemented by the server program, and wherein the endpoint of the second service definition hosts a second server program that is responsive to REST calls to an API implemented by the second server program.

15. The computer system of claim 11, wherein each service definition of the plurality of different service definitions includes identification of an underlying schema, wherein for generating the combined schema, the operations further comprise:

validating each service definition of the plurality of different service definitions based on each respective underlying schema.

16. The computer system of claim 11, wherein for generating the combined schema, the operations further comprise:

generating a first resolver function to resolve the first field in the combined schema with the first resource; and generating a second resolver function to resolve the second field in the combined schema with the second resource.

17. The computer system of claim 16, wherein for retrieving the first resource from the endpoint of the first service definition and the second resource from the endpoint of the second service definition, the operations further comprise:

causing executing the first resolver function to resolve the first field in the combined schema with the first resource; and causing executing the second resolver function to resolve the second field in the combined schema with the second resource.

18. The computer system of claim 11, wherein the one or more schema definition language elements of each service definition include a query type comprising one or more fields, and wherein the combined schema aggregates each of the one or more fields of the query type of the one or more schema definition language elements of each service definition into one or more fields of the combined schema.

19. The computer system of claim 11, wherein the one or more schema definition language elements of the first service definition include a first type comprising one or more fields, wherein the one or more schema definition language elements of the second service definition include a second type comprising one or more fields, and wherein the schema blueprint data includes a mapping of the one or more fields of the first type of the first service definition to be resolved by the one or more fields of the second type of the second service definition.

20. The computer system of claim 11, wherein the one or more schema definition language elements of the first service definition include a first type comprising one or more fields, the one or more fields including a scope identifier, and wherein the query to the graph endpoint causes the graph endpoint to perform a scope check based on the scope identifier and one or more scopes included in the query.

\* \* \* \* \*